April 29, 1924. Re. 15,825

C. E. FOLK

MANDREL FOR SQUARING PISTONS

Original Filed Aug. 26, 1920

Inventor
Charles E. Folk.

By

Attorney

Reissued Apr. 29, 1924. Re. 15,825

UNITED STATES PATENT OFFICE.

CHARLES E. FOLK, OF HAGERSTOWN, MARYLAND.

MANDREL FOR SQUARING PISTONS.

Original No. 1,440,450, dated January 2, 1923, Serial No. 406,204, filed August 26, 1920. Application for reissue filed June 11, 1923. Serial No. 644,814.

*To all whom it may concern:*

Be it known that I, CHARLES E. FOLK, a citizen of the United States, residing at Hagerstown, in the county of Washington and State of Maryland, have invented certain new and useful Improvements in Mandrels for Squaring Pistons, of which the following is a specification.

The invention relates to improvements in mandrels for squaring pistons, and has for its object to provide a simple, cheap and efficient device for setting pistons through on the crank shaft.

The invention consists of the novel construction and arrangement of the parts and combination of parts hereinafter more fully set forth in the following specification and pointed out in detail in the appended claims.

Figure 1:
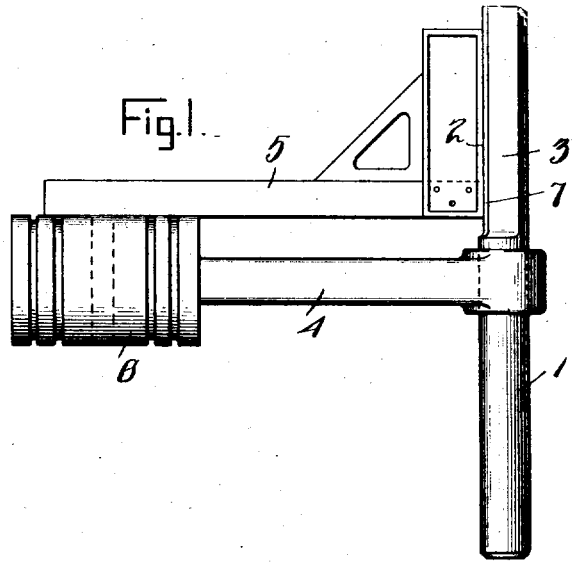
Figure 2:
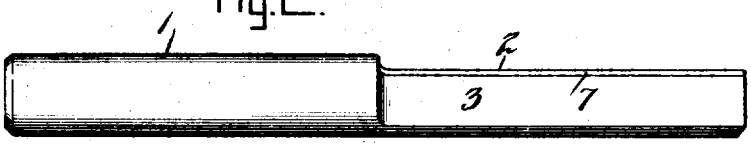
Figure 3:
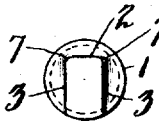

Referring to the accompanying drawing which is made a part hereof and on which similar reference characters indicate similar parts, Figure 1 is a side view of my invention projecting through the end of a connecting rod and showing the piston being squared thereon, Figure 2, an enlarged side view of the mandrel, and Figure 3, an end view of Figure 2.

In the drawing reference character 1 designates the mandrel which is round at one end and has its opposite end cut away to form the flat top 2 and sides 3, the flat upper side 2 being for the purpose of holding the square when the piston is being squared on the connecting rod. The flat sides 3 are clamped between a vise (not shown) or other suitable tool for holding the mandrel when in use. The end of the mandrel having the flat top and sides is smaller in diameter than the rounded end.

The round end of the mandrel 1 is placed in the end of the connecting rod 4 as shown in Figure 1, and the square 5 is placed on the flat surface 2 of the mandrel with its upper edge projecting against the outer surface of the piston 6 and when the latter is perfectly square on the rod 4 the mandrel 1 is removed from the rod 4 and the piston is then connected up to the crank shaft of the engine. The edges 7 of the upper surface 2 are slightly bevelled to prevent injury to the said surface 2 when the device is clamped in a vise or other holding means.

Since the edges of the flat faces are parallel to the axis of the mandrel the device may also be used for squaring piston pins as by locating a square with one arm in line with such an edge, when the other arm may be caused to rest against the piston pin so as to indicate any want of proper alinement. The same thing may be done more quickly and accurately by the use of a surface gage, and the pin alined by twisting the rod.

Having thus fully described my said invention, what I claim as new and desire to secure by Letters Patent, is:

1. A mandrel for squaring pistons being rounded at one end and cut away at its opposite end to form two flat side surfaces and a flat upper surface, the edges of said flat upper surface being slightly beveled, and the end having the cut away sides and top being smaller in diameter than the rounded end, substantially as set forth.

2. A mandrel for squaring pistons said mandrel having at one end two flat surfaces opposite each other and a flat upper surface between them the meeting edges of said surfaces being slightly beveled, substantially as set forth.

3. A tool for squaring pistons comprising a bar reduced at opposite sides for a part of its length to form parallel flat holding faces and at a third side to provide a gaging face perpendicular to and lying between said parallel faces, substantially as set forth.

4. A device for squaring pistons and alining piston pins comprising a shank having flat side faces, and a flat upper face between the side faces the edges between the adjacent faces being parallel to the axis of the shank, substantially as set forth.

5. A tool for squaring pistons and piston pins provided with a cylindrical part to fit in a connecting rod bearing, and a flat gaging face adjacent thereto said face having an edge parallel to the axis of the tool and adapted to coact with a gage in testing the alinement of a wrist pin on the connecting rod, substantially as set forth.

6. A mandrel for squaring pistons said mandrel being cylindrical at one end and having a flat face extending from a point near the middle of the bar to the opposite end, substantially as set forth.

7. A mandrel for squaring pistons said mandrel being cylindrical at one end and having a flat face extending from a point near the middle of the bar to the opposite end, and additional flattened faces at opposite sides for engagement by the jaws of a vise, substantially as set forth.

In witness whereof, I have hereunto set my hand at Washington, D. C., this 24th day of April, A. D. nineteen hundred and twenty-three.

CHARLES E. FOLK.

Witness:
O. M. Keys.